March 16, 1965   A. H. GALANIUK   3,173,303
SYNCHRONIZED GEAR TRANSMISSION
Filed April 4, 1961   5 Sheets-Sheet 1

INVENTOR.
ALEXANDER H GALANIUK
BY John R. Faulkner
Donald J. Harrington
ATTORNEYS.

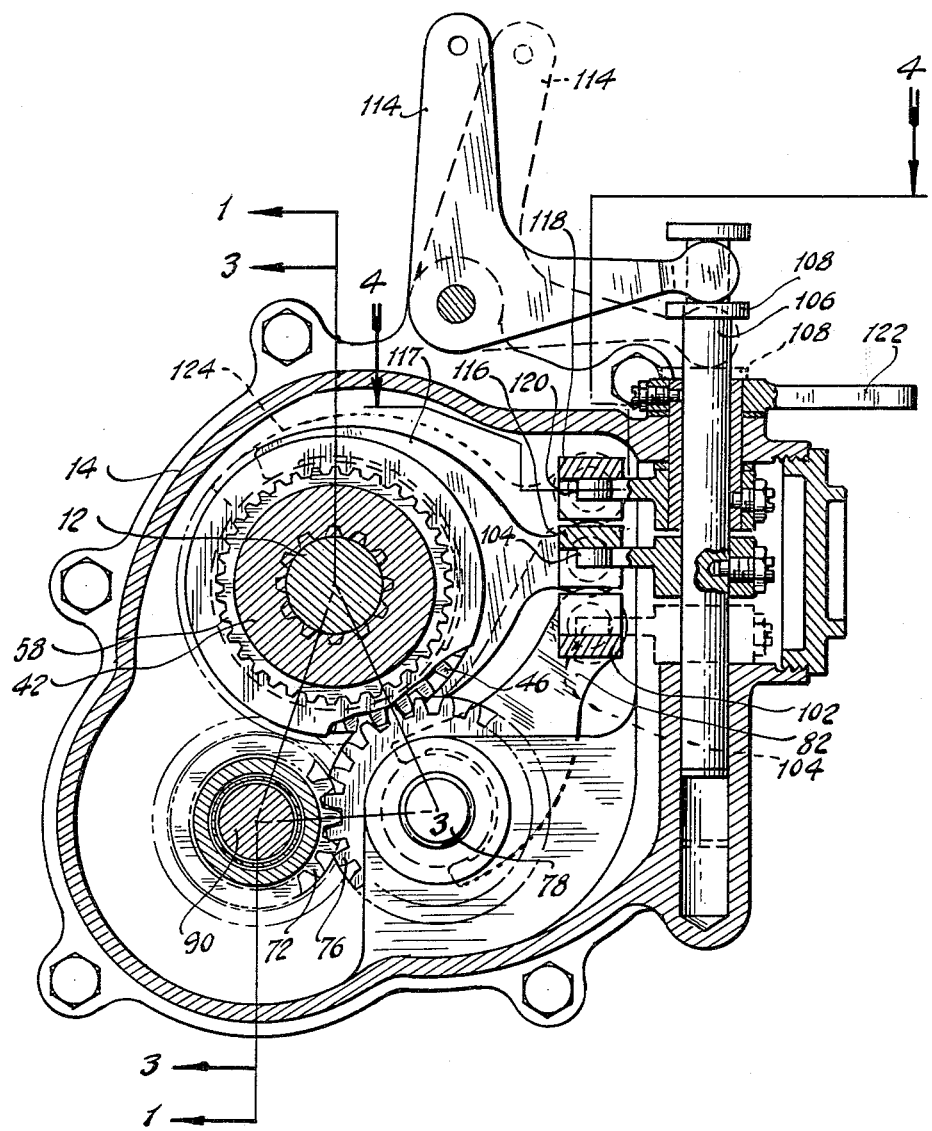

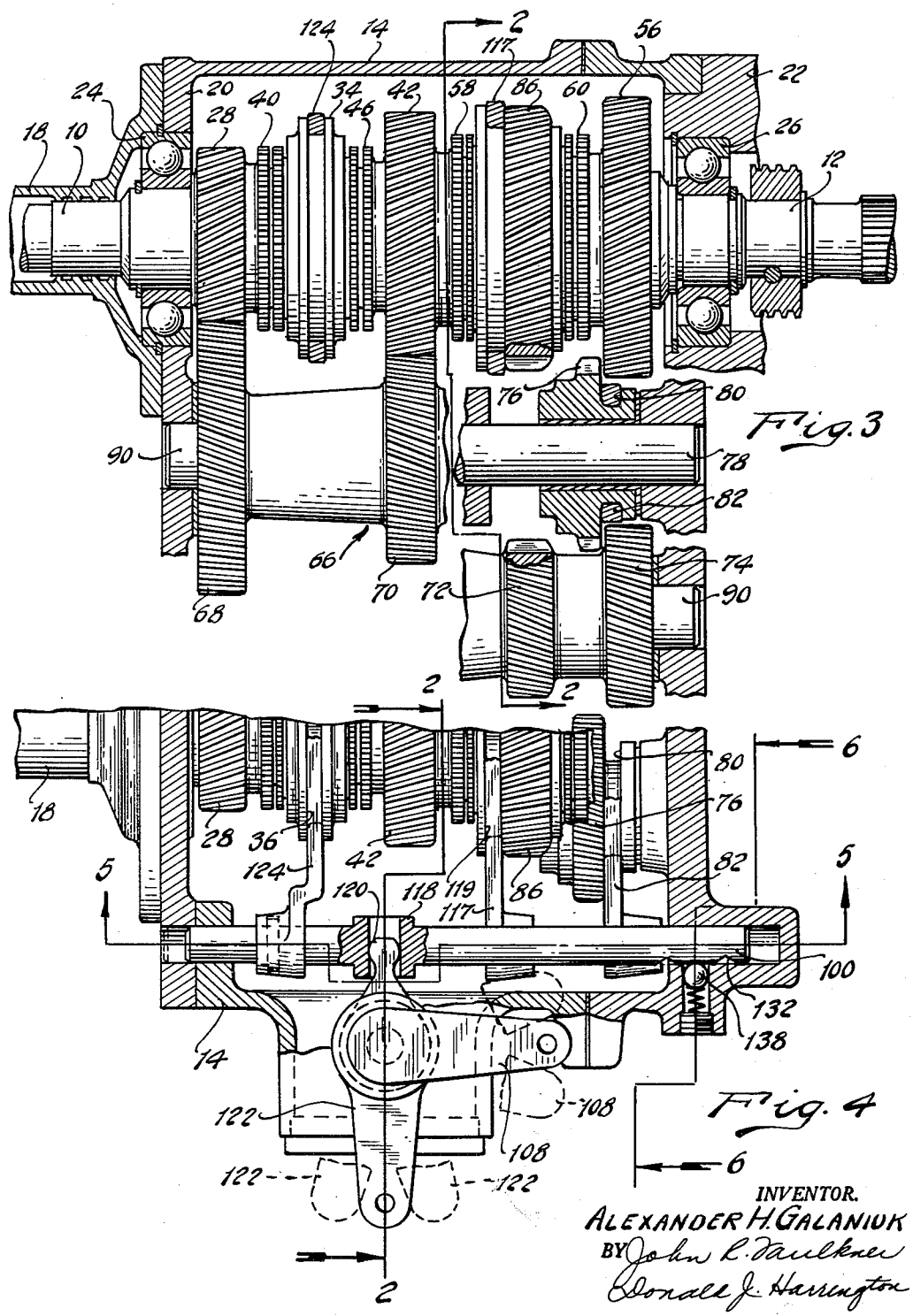

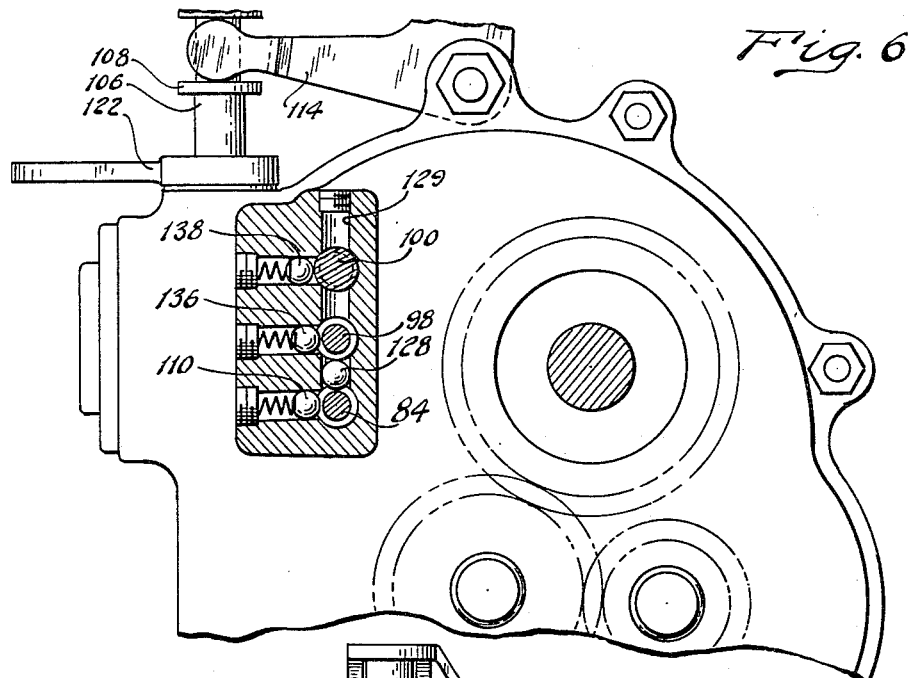
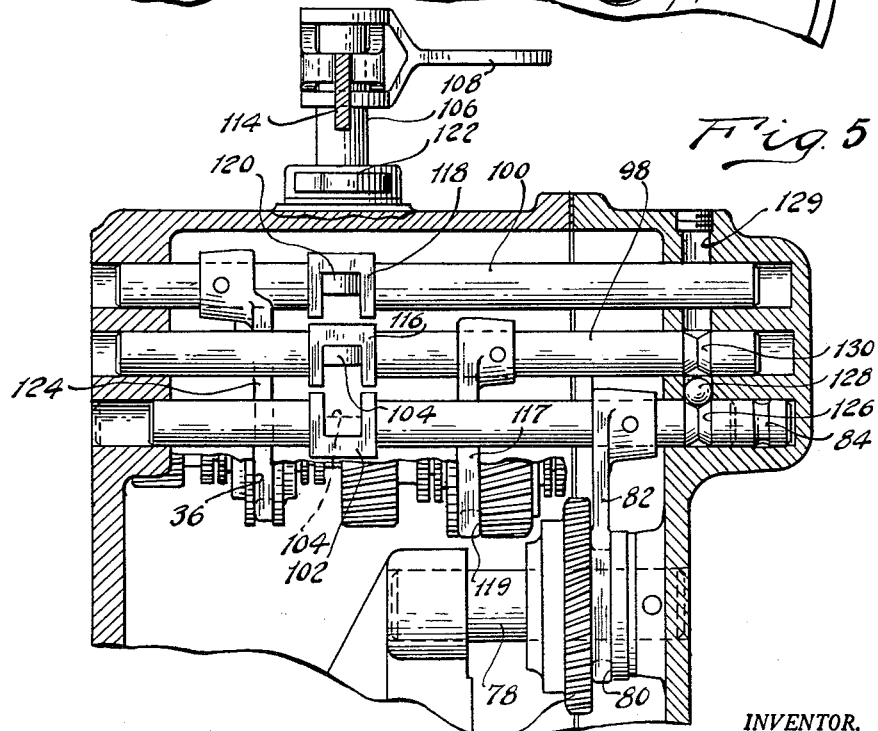

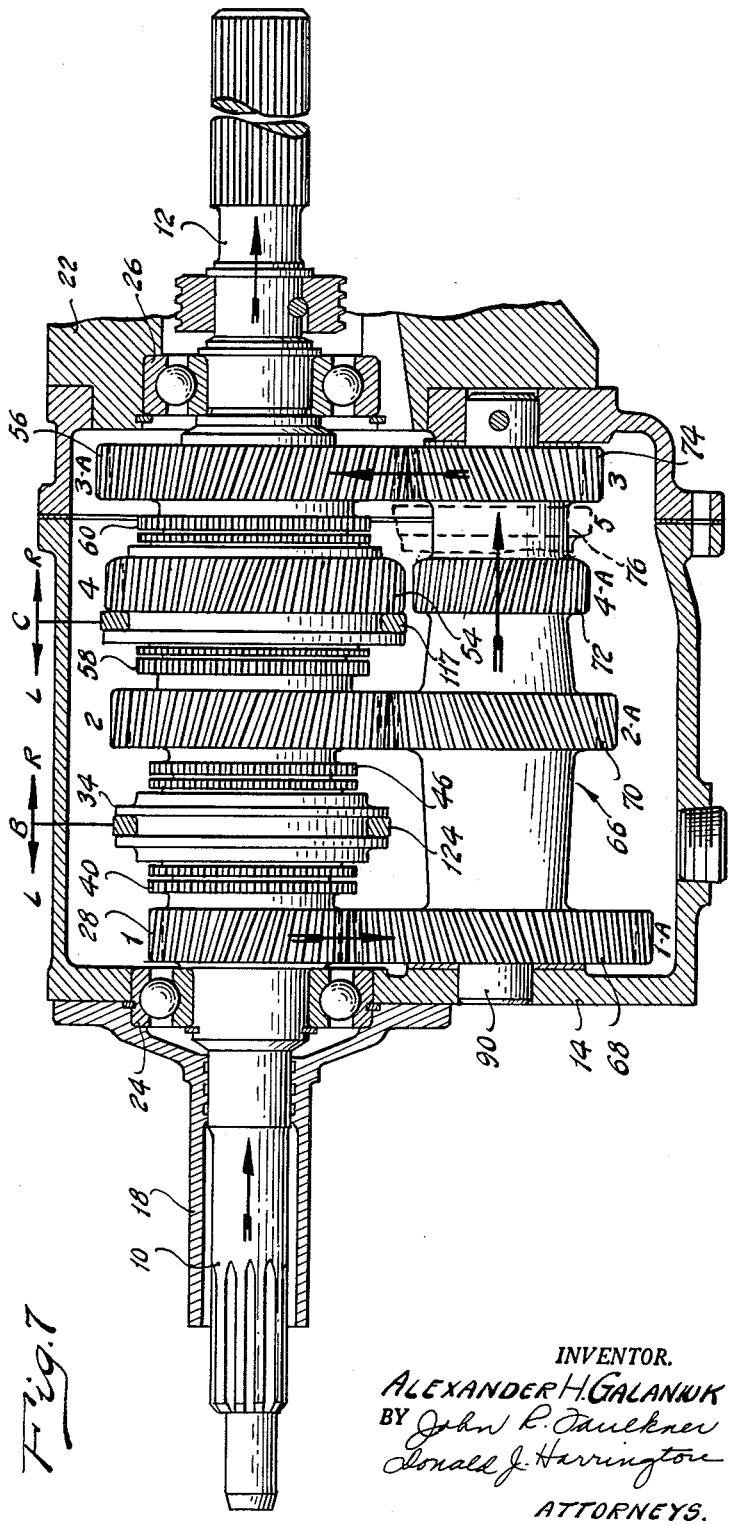

United States Patent Office 3,173,303
Patented Mar. 16, 1965

3,173,303
SYNCHRONIZED GEAR TRANSMISSION
Alexander H. Galaniuk, Dormagen, Germany, assignor to Ford Motor Company, Dearborn, Mich., a corporation of Delaware
Filed Apr. 4, 1961, Ser. No. 100,682
1 Claim. (Cl. 74—375)

My invention relates generally to a new and improved power transmitting mechanism and more particularly to a multiple speed power transmitting mechanism including synchronized torque transmitting gears.

My invention is adapted particularly to be used in the driveline of an automotive vehicle for transferring engine torque to the vehicle traction wheels. It includes a plurality of gear elements situated in concentric relationship with respect to the power input shaft and the power output shaft.

According to a principal feature of my invention, the power input shaft is coupled to the driving element by a synchronizer clutch assembly. The driven portions of this synchronizer clutch assembly are each connected to separate power input gear elements to provide two relatively low speed gear ratios. According to a preferred embodiment of my invention, a second synchronizer clutch element is employed to control the relative motion of other gear elements in the mechanism to establish one or more additional driving speed ratios. Means are provided also for establishing a reverse driving speed ratio.

The synchronizer clutch assembly associated with the double power input gear elements thereby doubles the number of forward driving speed ratios that are made available by the other gear elements in the mechanism. It functions also to double the number of reverse driving speed ratios.

In my preferred embodiment, I have provided a gear arrangement capable of establishing four forward driving speed ratios and two reverse driving speed ratios. This is accomplished by employing the same number of gears that are used in a conventional gear box having three forward driving speed ratios and a single reverse speed ratio. Also, the space required to accommodate the gear elements of my improved gear arrangement is substantially the same as the space required by a three-speed synchronized gear transmission.

For the purpose of more particularly describing my invention, reference will be made to the accompanying drawings, wherein:

FIGURE 2 is a transverse cross sectional view of the mechanism of FIGURE 1 taken along section line 2—2 of FIGURE 4;

FIGURE 3 is a longitudinal cross sectional view of the mechanism of FIGURE 1 showing in elevation the gear elements and the reverse drive pinion;

FIGURE 4 is a partial cross sectional view showing a portion of the structure for initiating a change in the speed ratio of the gear elements, and it is taken along section line 4—4 of FIGURE 2;

FIGURE 5 is a partial cross sectional view showing the shift rails for my improved mechanism and it is taken along section line 5—5 of FIGURE 2;

FIGURE 6 is a partial cross sectional view showing the interlock mechanism for the shift rails of FIGURE 5, and it is taken along section line 6—6 of FIGURE 4;

FIGURE 7 is a longitudinal cross sectional view of my transmission mechanism showing the cluster gear assembly in elevation; and FIGURE 8 is a chart that indicates the mode of operation of the transmission mechanism.

Figure 1:
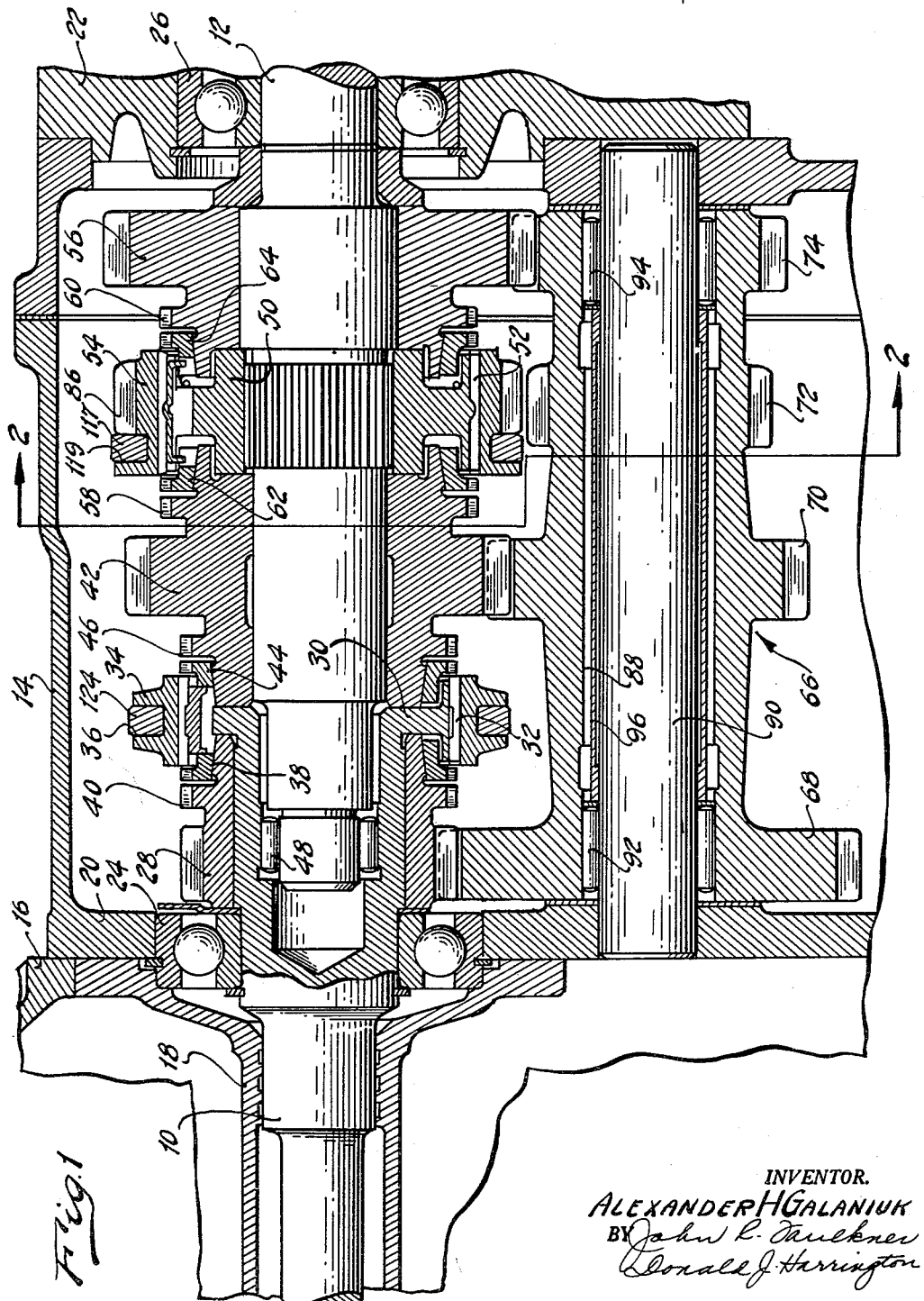
FIGURE 1 is a longitudinal cross sectional assembly view of my improved transmission mechanism.

For the purpose of particularly describing a preferred embodiment of my invention, reference will be made to FIGURE 1 wherein numeral 10 designates a power input shaft and numeral 12 designates a power output shaft. A transmission casing 14 is provided as shown, and it encloses a plurality of torque transmitting gear elements. The casing 14 can be secured by suitable bolts, not shown, to a neutral clutch housing 16 that is adapted to enclose a friction clutch capable of connecting the shaft 10 to an engine crankshaft. A clutch bearing support member 18 surrounds shaft 10 as indicated. The housing 14 includes spaced walls 20 and 22 within which shafts 10 and 12, respectively, are journaled. Wall 20 has received therein a bearing 24 and a corresponding bearing 26 is received within a cooperating opening in wall 22. The shaft 10 is received within the inner race for the bearing 24 and it has journaled thereon input gear 28.

Shaft 10 also carries synchronizer clutch hub 30 having externally situated spline teeth 32. A synchronizer clutch sleeve 34 is splined internally and slidably mounted upon spline teeth 32. Sleeve 34 is formed with an annular groove 36 to accommodate a gear shifter fork. A synchronizer blocker ring 38 is disposed about a conical clutch portion of the gear 28 and is positioned between sleeve 34 and external clutch teeth 40. When sleeve 34 is moved in a left-hand direction as viewed in FIGURE 1, blocker element 38 establishes a synchronizing action between gear 28 and shaft 10 in known fashion. When the sleeve 34 is moved to the extreme left-hand position, the clutch teeth 40 engage the internal teeth of sleeve 34 to establish a driving connection between shaft 10 and gear 28.

Shaft 12 has journaled thereon a second gear 42 and it includes a conical surface adjacent the hub 30 about which is positioned a second synchronizer blocker ring 44. When synchronizer sleeve 34 is moved in a right-hand direction as viewed in FIGURE 1, clutching action is established between sleeve 34 and external synchronizer clutch teeth 46 formed on gear 42. This establishes a driving connection between shaft 10 and gear 42.

The end of shaft 10 is formed with a bearing opening within which is received the end of shaft 12, a suitable pilot bearing 48 being provided to permit a bearing action between these members.

A second synchronizer hub 50 is splined to shaft 12 as indicated. This hub also is formed with external spline teeth 52 on which is mounted an internally splined synchronizer clutch sleeve 54.

A third gear 56 also is journaled for rotation about shaft 12 adjacent the hub 50. Gear 42 and gear 50 are formed with synchronizer clutch teeth 58 and 60, respectively, and these teeth are adapted to establish a driving connection between hub 50 and one or the other of the gears 42 and 56. Synchronizer blocker rings 62 and 64 are situated between the sleeve 54 and the teeth 58 and 60, respectively. These blocker rings establish a synchronizing action between hub 50 and the gears 42 and 56 in known fashion.

A cluster gear assembly is indicated generally by numeral 66 and it includes gears 68, 70, 72 and 74. Gears 68 and 70 are in continuous meshing engagement with gears 28 and 42, respectively. Gear 74 is in continuous meshing engagement with gear 56.

Referring next to FIGURE 5, a reverse idler gear 76 is mounted for rotation about an axis parallel to the axis of cluster gear assembly 66. A suitable bearing shaft 78 is journaled in a boss formed on the housing 14 for supporting the gear 76. Gear 76 is formed with an annular groove 80 for accommodating a shifter fork 82 that is in turn carried by a shift rail 84.

Gear 76 can be moved into driving engagement with gear 72 by means of the shifter fork 82. When it is shifted in this fashion, it engages also an external gear 86 formed on sleeve 54 whenever the gear 86 assumes the neutral position indicated in FIGURE 1.

Cluster gear assembly 66 is formed with a central bearing opening 88 through which bearing shaft 90 is received. Spaced bearings 92 and 94 are provided for journaling the cluster gear assembly. A suitable bearing spacer sleeve 96 is provided as indicated. The gear arrangement thus described is capable of providing four forward driving speed ratios and two reverse driving speed ratios.

A table explaining the operating shift sequence is shown in FIGURE 8. The synchronizer clutch assembly associated with gears 28 and 42 is designated in FIGURE 8 as clutch B and the other synchronizer clutch assembly is designated as clutch C. The nomenclature used in the table of FIGURE 8 can be applied to FIGURE 7 so that these figures can be referred to together in describing the mode of operation.

To establish the first speed ratio, clutch sleeve 34 is shifted in a left-hand direction as viewed in FIGURE 1 and sleeve 54 is shifted in a right-hand direction. Torque is thereby transferred from shaft 10 to shaft 12 through gears 28, 68, 74 and 56. Gear 28 functions in this fashion as a power input gear.

To establish second speed ratio operation, the sleeve 34 is retained in a left-hand position and the sleeve 54 is shifted in a left-hand direction. This establishes a driving connection between gear 42 and shaft 12 and disconnects gear 56 from shaft 12. Torque is thus delivered from shaft 10 to shaft 12 through gears 28, 68, 70 and 42.

To establish third speed ratio operation, the sleeves 34 and 54 are shifted to their respective right-hand positions thus connecting shaft 10 to gear 42 and connecting shaft 12 to gear 56. Gear 28 is disconnected from shaft 10 and gear 42 becomes disconnected from shaft 12 and connected to shaft 10 instead. Gear 42 is thus caused to function as a power input gear for the mechanism instead of gear 28. Torque is delivered from shaft 10 to shaft 12 during third speed ratio operation through gears 42, 70, 74 and 56.

To establish fourth gear operation, the sleeve 34 retains its right-hand position and the sleeve 54 is moved in a left-hand direction. This establishes a direct driving connection between shafts 10 and 12.

Reverse drive is obtained by shifting sleeve 54 to the neutral position shown in FIGURE 1 and by shifting the reverse idler pinion 56 in a left-hand direction as viewed in FIGURE 5. This brings pinion 56 into meshing engagement with gears 72 and 86. A reverse driving power delivery train is thus established between cluster gear assembly 66 and the power output shaft 12. Either one of two reverse idler positions can be obtained depending upon which position the sleeve 34 assumes. When the sleeve 34 is in a left-hand position, gear 28 functions as a power input gear and a relatively low speed reverse drive ratio is obtained. When the sleeve 34 is shifted in a right-hand position, the gear 42 functions as a power input gear and a relatively high speed reverse drive is obtained.

During operation in any given speed ratio, relative rotation of the gears 28 and 42 will take place relative to shafts 10 and 12, respectively. However, since the rotation of these gears with respect to the shafts 10 or 12 is in the same direction as the direction of rotation of shafts 10 or 12, the idling motion of the gears does not present a serious design problem.

In FIGURES 5 and 6 I have illustrated the shifting forks and the associated shift rails for controlling the motion of the clutches B and C. I have shown also the means for shifting the reverse idler. Three shift rails are shown in FIGURE 5, the previously mentioned rail 84 being adapted to control the motion of the reverse idler, the shift rail 98 being provided for controlling the motion of clutch C and shift rail 100 being provided for controlling the motion of clutch B. Each of the shift rails is supported in cooperating aligned openings in the transmission housing. The rails 84, 98 and 100 are positioned with their axes extending parallel to the common axis of shafts 10 and 12 and they are each adapted to shift axially within their associated mounting structures. A collar 102 is carried by rail 84 and it defines a recess within which a finger 104 can be received. Finger 104 is carried by a shaft 106 extending transversely with respect to the axis of the shift rails. The shaft extends externally of the transmission housing as shown in FIGURES 5 and 6. A shift lever 108 is carried by the outermost extremity of the shaft 106 and when it is rotated about the axis of shaft 106 shifter finger 104 will cause rail 84 to reciprocate in the direction of its axis from one position to another. As illustrated in FIGURE 5, the shift rail 84 causes the shifter fork 82 to move the reverse idler gear 76 to an inoperative position. When it is in this position a spring loaded detent ball 110 engages a cooperating detent groove in the rail 84.

When the lever 108 is rotated in the opposite direction, the shifter fork 82 will move the reverse idler pinion 86 in a left-hand direction as viewed in FIGURE 5 to the position defined by detent ball 110 and the associated groove. When the reverse idler pinion is in this position, reverse drive may be obtained by appropriately positioning the clutch B as previously explained.

Shaft 106 can be oscillated in the direction of its axis by means of a shift lever 114 as shown in FIGURE 6. The end of the lever 114 engages a cooperating collar on the shaft 106, and when the lever 114 is oscillated in a clockwise direction, shaft 106 moves upwardly as viewed in FIGURE 6. This causes the finger 104 to engage a cooperating collar 116 carried by shift rail 98. When the finger 104 is in this position, the shift rail 98 can be reciprocated in the direction of its axis by appropriately moving lever 108. This will appropriately position the sleeve 54 for the synchronizer clutch C. Rail 98 carries a shifter fork 117 that is adapted to be received within an annular groove 119 in the sleeve 54 for the synchronizer clutch C.

Shift rail 100 carries a collar 118 that is adapted to receive the end of a shifter finger 120 carried by a shaft, not shown, extending in a direction parallel to shaft 106. This shaft extends outwardly and has connected thereto a shifter lever 122 as viewed in FIGURES 5 and 6. When lever 122 is rotated, the shifter finger 120 will cause shift rail 100 to reciprocate between two operating positions to appropriately position the sleeve 34 for the synchronizer clutch B. A shifter fork 124 is carried by rail 100 and is adapted to be received within annular groove 36 on the sleeve 34.

I have illustrated in FIGURE 6 an appropriate interlock system for the shift rails 84, 98 and 100. Shift rail 84 is formed with an annular groove 126 within which an interlock ball 128 may be positioned. The ball 128 is received within an opening which extends transversely with respect to the axes of the shafts 84, 98 and 100. The adjacent shaft 98 also is formed with an annular groove 130 capable of receiving the ball 128. When the shift rail 84 is in the inoperative position, the ball 128 is received within the groove 126 and the shift rail 98 can be shifted without interference with the interlock ball 128. When the rail 84 assumes a reverse driving position, however, the ball 128 will be urged by the shift rail 84 into registry with the groove 130 of the shaft 98. This prevents movement of the shaft 98 from a neutral position when the reverse idler pinion assumes a reverse drive position. The groove 130 is in alignment with ball 128 only when rail 98 assumes a neutral position, and thus a shifting movement of the reverse idler pinion can be accomplished only when the clutch C is in the neutral position.

It will be observed that the rail 100 can be shifted from one position to another regardless of the position of rail 84. Since this is the case, the clutch B can be shifted to either of its two operating positions when the reverse idler pinion is in a reverse driving position. A two-speed reverse drive thus can be accomplished by shifting appropriately the clutch B.

The neutral position for the rail 98 and the two operative positions for rail 100 can be defined by a suitable spring loaded detent comprising detent balls 136 and 138, respectively. These detent balls are engageable with annular grooves formed on the shift rails. For clarity, the clutch B is shown in an intermediate position although it assumes either of the two clutching positions when in operation.

Having thus described a preferred embodiment of my invention, what I claim and desire to secure by United States Letters Patent is:

A power transmission mechanism comprising a power input shaft, a power output shaft, a multiple speed gear train situated between said shafts, comprising, first, second and third gear elements journaled for rotation about the axes of said shafts, a cluster gear assembly journaled for rotation about an axis parallel to the axes of said shafts, said cluster gear assembly comprising separate gear portions engageable with each of said gears, first synchronizer clutch means for clutching separately said power input shaft to said first and second gears, second synchronizer clutch means for clutching separately said power output shaft to said second and third gears, the selective engagement of said synchronizer clutch means with said gears providing four forward speed drives, said second synchronizer clutch means including a sleeve defining a reverse sliding gear, a reverse drive gear portion formed on said cluster gear assembly, a reverse idler pinion journaled for rotation about an axis parallel to the axis of said cluster gear assembly, said reverse idler pinion being engageable with said sliding gear and said reverse drive gear portion to establish a reverse drive torque delivery path between said cluster gear assembly and said power output shaft, said second synchronizer clutch means assuming a neutral position when said sliding gear assumes a reverse drive position, and means for shifting said reverse idler pinion into and out of engagement with said reverse drive gear portion in the direction of its axis, the alternate engagement of said first synchronizer clutch means with said first and second gears while said reverse idler pinion engages said reverse gear portion providing two reverse drives through said transmission.

References Cited in the file of this patent

UNITED STATES PATENTS

| | | |
|---|---|---|
| 1,984,618 | Wirrer | Dec. 18, 1934 |
| 2,106,841 | Griswold | Feb. 1, 1938 |
| 2,206,409 | Kummich | July 2, 1940 |
| 2,505,449 | Wemp | Apr. 25, 1950 |
| 2,943,502 | Perkins | July 5, 1960 |

FOREIGN PATENTS

| | | |
|---|---|---|
| 1,190,434 | France | Mar. 31, 1959 |
| 1,191,110 | France | Apr. 6, 1959 |